Patented Oct. 24, 1922.

1,433,004

UNITED STATES PATENT OFFICE.

PHILIPPE AUGUSTE GUYE, OF GENEVA, SWITZERLAND, ASSIGNOR TO L'AZOTE FRANCAIS, SOCIÉTÉ ANONYME, OF PARIS, FRANCE.

PROCESS FOR RECOVERING NITROUS VAPORS IN THE FORM OF AQUEOUS NITRIC ACID.

No Drawing. Application filed October 6, 1920. Serial No. 415,106.

*To all whom it may concern:*

Be it known that I, PHILIPPE AUGUSTE GUYE, professor of chemistry at the University of Geneva, a citizen of Switzerland, residing at Geneva, Canton of Geneva, in the Confederation of Switzerland, have invented certain new and useful Improvements in Processes for Recovering Nitrous Vapors in the Form of Aqueous Nitric Acid, of which the following is a specification.

The present invention relates to a process for recovering nitrous vapors in the form of aqueous nitric acid.

The nitrous vapors which are diluted in a great excess of nitrogen and oxygen, for instance at a rate of 1% $NO_2$ by volume, are not easily absorbed by water. That is the reason why the industrial devices such as for instance washing towers, which are employed in such a case, do hardly allow to easily recover a nitric acid of a concentration superior to 20 to 30 per cent $HNO_3$.

It has been found that by interposing in the gaseous current fibrous substances such as glass-wool or cotton impregnated with water, it is easy to obtain a concentrated nitric acid containing up to 50 and 55 per cent $HNO_3$.

Upon this observance the following process is based.

The mixture of nitrogen and oxygen containing small doses of nitrous vapors is directed through devices such as towers, reaction rooms and the like containing fibrous materials impregnated with water; while the gases pass through those materials the water is charged with nitric acid.

The process may be an intermittent one and then the acid formed may be separated by draining, by centrifugal force or by expressing. The process may also be a continuous one by introducing into the upper portion of the apparatus containing the fibrous materials, a small water stream whilst at the bottom part the solution of nitric acid is collected.

As fibrous material all bodies having this structure and which resist more or less nitric acid of medium concentration may be employed; these bodies are for instance: glasswool, asbestos fibres; cotton may be employed for nitric acid the concentration of which does not exceed 50 per cent $HNO_3$; the glass-wool and asbestos may also be admixed with the cotton.

These bodies may be employed alone or two or three of them may be mixed together for example, cotton and glass-wool or cotton, glass-wool and asbestos.

I claim:

1. A process for recovering nitrous vapors which are diluted with an excess of nitrogen and oxygen, consisting in causing these gases to react with water which impregnates fibrous materal resistant to nitric acid.

2. A process for recovering nitrous vapors which are diluted with an excess of nitrogen and oxygen, consisting in causing these gases to react with water which impregnates cotton.

3. A process for recovering nitrous vapors which are diluted with an excess of nitrogen and oxygen, consisting in causing these gases to react with water which impregnates a mixture of glass-wool and cotton.

4. A process for recovering nitrous vapors which are diluted with an excess of nitrogen and oxygen, consisting in causing these gases to react with water which impregnates a mixture of glass-wool, asbestos fibres and cotton.

In testimony whereof I affix my signature in presence of two witnesses.

PHILIPPE AUGUSTE GUYE.

Witnesses:
ROBT. B. MACATEE,
H. FRIEDRICH.